Aug. 12, 1969  G. E. KEEFER  3,460,932
GAS FIRED FRIT MELTER

Filed May 17, 1966  3 Sheets-Sheet 1

INVENTOR.
GEORGE E. KEEFER
BY
W. A. Schuch
ATTORNEY

Aug. 12, 1969   G. E. KEEFER   3,460,932
GAS FIRED FRIT MELTER

Filed May 17, 1966   3 Sheets-Sheet 2

Aug. 12, 1969  G. E. KEEFER  3,460,932
GAS FIRED FRIT MELTER

Filed May 17, 1966  3 Sheets-Sheet 3

INVENTOR.
GEORGE E. KEEFER
BY
ATTORNEYS

United States Patent Office 3,460,932
Patented Aug. 12, 1969

3,460,932
GAS FIRED FRIT MELTER
George E. Keefer, Toledo, Ohio, assignor to Owens-Illinois, Inc., a corporation of Ohio
Filed May 17, 1966, Ser. No. 550,789
Int. Cl. C03b 5/32
U.S. Cl. 65—335                                6 Claims

ABSTRACT OF THE DISCLOSURE

The melting of batch materials containing highly oxidized metals to form a frit composition is carried out in a metal melter with an inert atmosphere. The metal melter is constructed such that the products of combustion from the gas fired burners are prevented from contacting the batch ingredients during melting or the molten frit and vertically spaced zones permitting controlled, selected temperatures are provided.

---

This invention relates to apparatus for melting colorant glass batch.

More specifically, this invention relates to a method and apparatus for melting frit glasses that contain metals in highly oxidized states.

It has been the practice in the past to use refractory lined furnaces for melting frits used for coloring or tinting flint glasses. These refractory lined furnaces are normally heated by flame from the burning of a combustible fuel in which the flame normally extends over the open upper surface of the glass batch in the furnace. The flame and products of combustion come in contact with the frit batch and with the melted frit. Both the refractory used to line the furnaces and the products of combustion have an adverse effect on the quality of the frit.

With the foregoing in view, applicant has found that a frit melter formed of a heat-resistant metal forming the melting chamber obviates the problems attendant with the use of a refractory lined melter.

Applicant has also found that the melting of glasses to be used as frits which have highly oxidized metals contained in the batch, may be economically melted by providing a melting chamber in which a controlled atmosphere may be supplied to the heated batch and the molten frit.

Therefore, it is an object of this invention to provide a frit melter formed of a heat-resisting metal serving as the container for the heated batch and molten frit produced therein.

It is a further object of this invention to provide a frit melting apparatus in which the atmosphere surrounding the batch in the melter may be controlled either as to composition or pressure.

It is an additional object of this invention to provide a glass frit melting apparatus in which the atmosphere surrounding the batch in the melter or contacting the molten frit may be selectively controlled as to composition.

It is a still further object of this invention to provide a gas fired frit melter in which the products of combustion of the gas firing are prevented from contacting the heated frit batch or the molten frit.

It is an additional object of this invention to provide a frit melting apparatus in which control of the heating may be effected so as to provide optimum conditions of melting and thermal control of the discharge of the molten frit.

It is a still further object of this invention to provide a method and apparatus for melting frit in which the combustible gas used for heating the frit is prevented from contacting the batch material or the molten frit and in which no refractory material contacts the frit or batch therefor during the heating and melting thereof.

Other and further objects may be apparent from the following description taken in conjunction with the annexed sheets of drawings, wherein.

Figure 1:
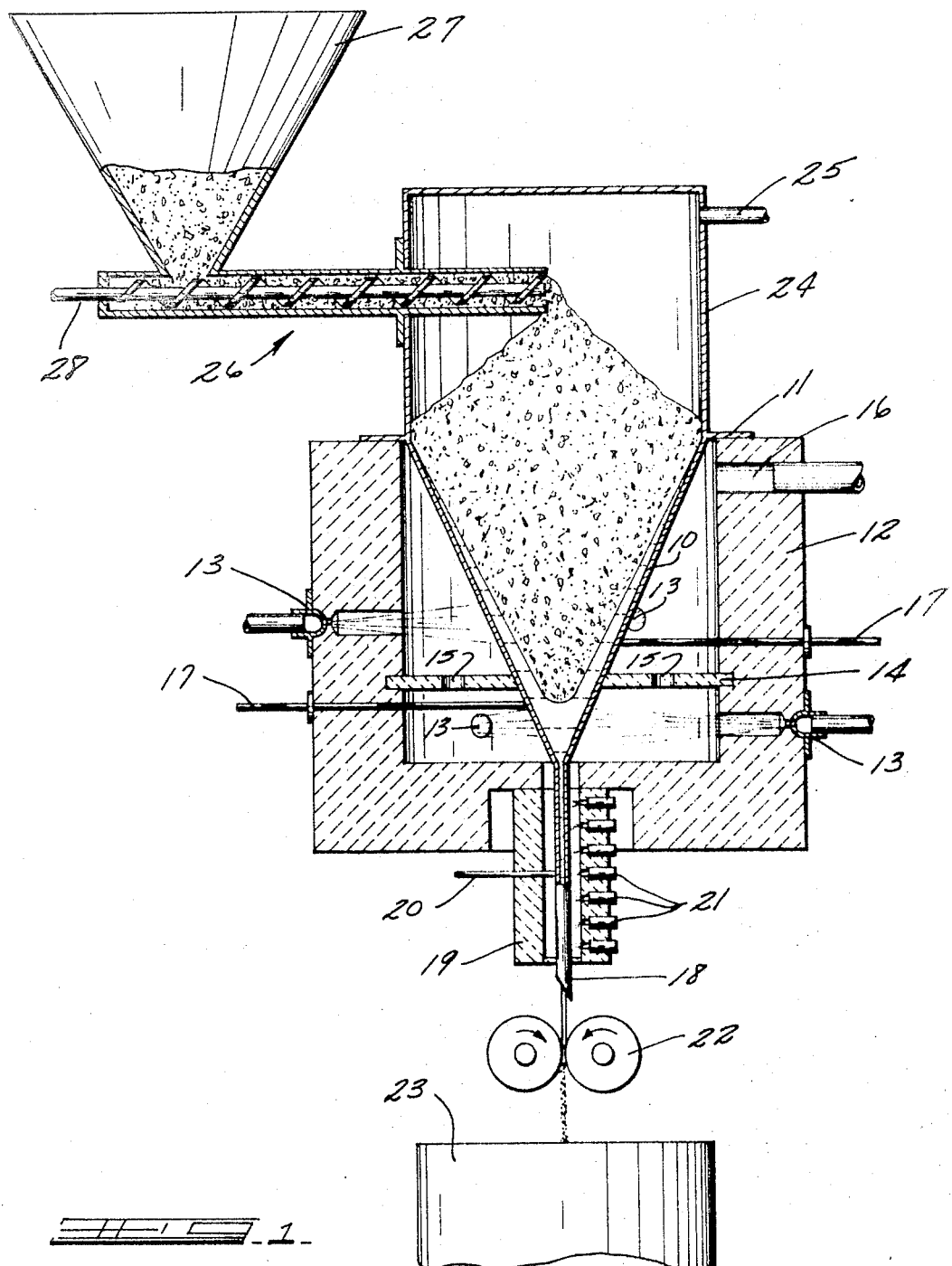
FIG. 1 is a side elevational view, partly in section, illustrating one embodiment of the invention.

With particular reference to FIG. 1, one embodiment of the apparatus of the invention takes the form of a heat-resistant metallic inverted cone 10 which is supported by an outstanding annular flange portion 11 formed integral therewith, which flange rests on the upper annular surface of a refractory lined combustion chamber 12. The combustion chamber 12 has a generally cylindrical, open interior which surrounds the cone 10. This interior portion of the chamber 12 serves as the combustion zone or heating zone and the chamber 12 is provided with a plurality of fuel inlets 13 through which a suitable gas-air mixture is introduced.

Applicant has found that for superior temperature control, particularly with respect to vertical temperature gradients, it is advisable to divide the combustion zone surrounding the cone 10 into a plurality of vertically spaced areas.

With this in mind, a baffle wall 14, only one of which is shown in FIG. 1, although it is to be realized that more than one may be provided if desired, extends across and bridges the area between the cone and the combustion chamber 12.

A plurality of symmetrically placed holes 15 provide communication between the two zones and in particular provide an arrangement wherein the flue gases from the lower set of burners may escape into the zone above and with the combustion products formed therein, be permitted to vent through a flue 16 formed adjacent the upper end of the combustion zone and extending through the chamber wall 12.

For control purposes, temperature sensing elements 17 extending through the walls of the combustion chamber 12 and terminating adjacent the outer wall of the cone 10, may be provided, it being readily understood that the temperature sensing elements 17, of which there will be at least one for each separate heating zone, will indicate the temperature within the zone. Alternatively, these temperature sensing elements may be used as control monitors for the gas inlets 13 so as to control the burners and consequently the temperature of the zone of the cone 10 affected by the burners.

The cone 10 adjacent its lower apex is provided with a discharge tube portion 18 through which the molten frit will flow by gravity. The discharge tube 18 is surrounded by a refractory tube 19, having a bore somewhat larger than the external diameter of the tube 18. Within the chamber formed between these two tubes, a temperature sensing element 20 may be positioned and a plurality of burners 21, extending through the wall of the tube 19, will provide a blanket of heat for the external surface of the discharge tube 18.

The function of the heated discharge tube is to further refine the frit as it is being discharged from the cone 10. The frit, after being discharged through the tube 18, and as shown in FIG. 1, passes between fritting rolls 22.

While, as specifically shown in FIG. 1, the molten frit passes between the fritting rolls 22, it should be obvious that the molten frit could be discharged into a quenching bath directly. After passing between the fritting rolls the molten glass or frit is discharged into a suitable container 23 for storage and cooling.

Application has found that when melting glass batch for forming frit, particularly of the type which is highly color enriched, and which normally contains highly oxidized metals, such as chromium, cobalt, copper and selenium, it is advantageous that a controlled atmosphere be provided for the heated batch, and this is provided by a cover 24 which may be formed integral with the upper, open end or base of the cone 10. A pipe 25 connected through the wall of the cover may be utilized for the purpose of introducing a desired atmosphere to the area above the batch or may be used to provide a vacuum to the interior of the melting chamber.

In this system, where a continuous melting is to be carried out, it is desirable that a continuous feed of batch material be provided to the upper end of the cone, and with this in mind, a conventional auger 26, having its discharge end extending through the cover 24 will feed batch from a hopper 27 at any desired rate, depending upon the rate of rotation of the shaft 28.

While the use of an auger to continuously feed the batch into the melting chamber has been shown, obviously, the cover 24 may be provided with a lid through which discrete batch charges may be introduced where only a relative small quantity of frit is to be formed or where an intermittent batch charging system is to be utilized.

Figure 2:
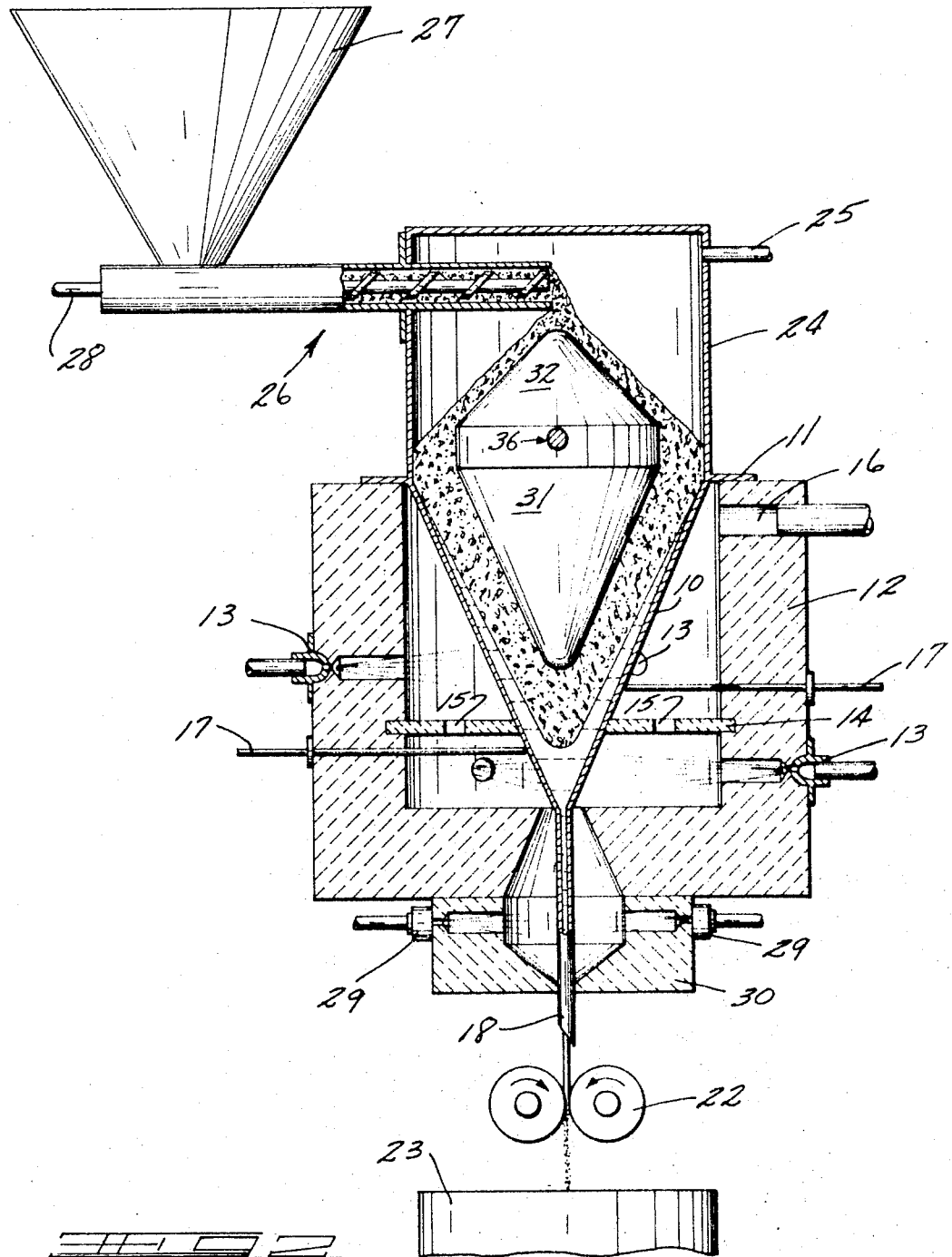
FIG. 2 is a side elevational view, partly in section, illustrating a second embodiment of the invention; and, FIG. 3 is a side elevational view, partly in section, illustrating a third embodiment of the invention.

With particular reference to FIG. 2, the second embodiment of the invention will be described in detail. Those elements of the apparatus which are substantially identical with those of the previously described embodiment have been given the same reference numbers and this description will deal with those parts thereof which are different.

As can readily be seen when viewing FIG. 2, the discharge tube 18 is surrounded by an annular ceramic or refractory burner support 30 to which are connected a plurality of gas burners 29. It should also be noted that the lower opening in the combustion chamber 12 through which the discharge tube 18 extends, has a downwardly and outwardly flaring contour which blends with the annular chamber formed within the ceramic burner support 30. In this particular arrangement, the products of combustion formed within the chamber surrounding the discharge tube will flow upwardly into the lower chamber or zone within the combustion chamber 12 and then pass through the openings 15 and be exhausted through the flue 16.

Inasmuch as all of the heat being applied to the cone 10 is being applied from the external portion thereof, it may be desirable to provide a second cone 31 positioned co-axial with respect to the cone 10 and being in complementary inverted relationship. The cone 31 is provided with a conical cover 32 serving as a batch directing and distributing cone so that the batch issuing from the discharge end of the auger 26 will be generally distributed about the axis of the cones 10 and 31 so that substantially equal quantities of batch will be presented to the annular area about the circumference of the cone 31. As the batch moves downwardly by gravity, it is heated and rendered molten. With the provision of the cone 31 within the cone 10, substantially less batch from a volume standpoint per unit area of heating will be presented for heating. In the event faster heating is required or desired, the cone 31 may be heated internally either by the connection of a gas burner thereto or, for example, by the positioning of electric heating elements 36 within the cone. In this manner the cone 31 will serve as an inner insulating surface.

The cone 31 in combination with cone 10, provides an annular chamber therebetween which is of less volume than the cone 10 alone, thus aiding in preventing segregation of the batch ingredients due to their differences in density.

Figure 3:
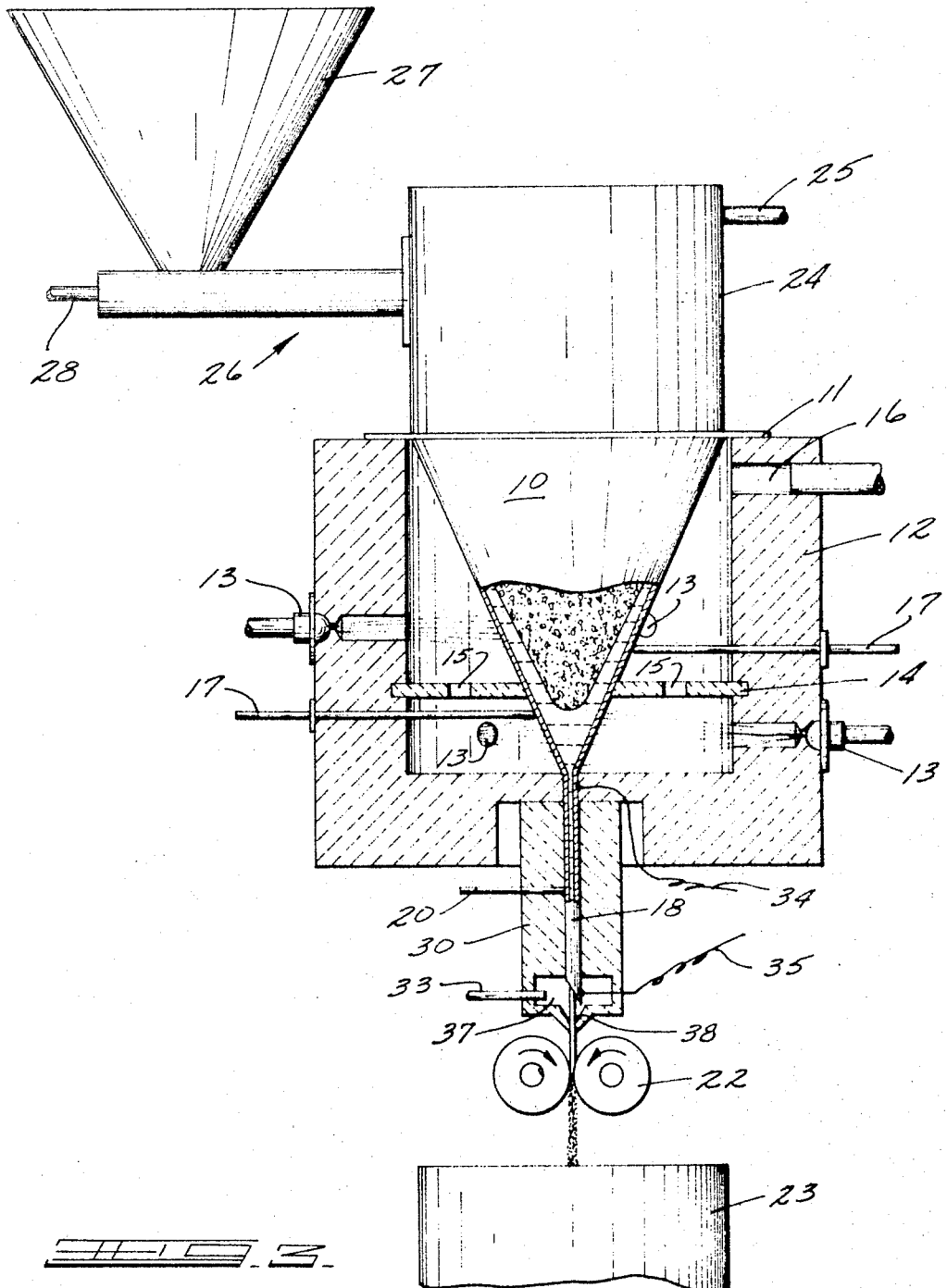

With particular reference to FIG. 3, there is shown a third embodiment of the apparatus of the invention which is similar to that shown in FIG. 1 and the same reference numerals have been applied to identical parts of the apparatus of FIG. 3 as those of FIG. 1.

The following description will deal primarily with those portions of the apparatus of FIG. 3 which differ from those of FIG. 1.

The cone 10 is provided, as in FIG. 1, with the elongated tubular outlet 18. In this embodiment, however, the tube 18 is surrounded by a closely fitting ceramic insulating member 30. The member 30 extends below the lower end of the tube 18. The lower portion of member 30 is formed with a chamber 37 at its lower end into which the tube 18 opens. An outlet orifice 38 is formed in the bottom of the chamber 37 and is positioned in axial alignment with the discharge tube 18. The chamber 37 is provided with a special atmosphere through the pipe 33 and in this particular embodiment the metal tube 18 is provided with electrical connections 34 and 35 for supplying heating current to the tube 18. In this manner, and under the control of the temperature sensing element 20, the tube 18 is heated electrically so as to keep the discharging glass in a molten state at the desired temperature. Since the chamber 37 is provided with a special atmosphere, and since the cover 24 may be evacuated, only selected gases such as $O_2$, $N_2$, $CO_2$, $H_2$ or $CO$ will contact the molten glass. With a negative pressure on the batch some of the selected gas will flow countercurrent to the glass flow. In this manner, contaminating gases may be prevented from reaching the molten frit glass in the cone 10. The selection of the gas depends upon the type or color of frit being produced keeping in mind that $O_2$ is oxidizing, $CO_2$ and $N_2$ are inert and $H_2$ and $CO$ are reducing. As in the previous embodiment the glass, after leaving the apparatus, may be fritted.

In summary, it can be seen that applicant has provided an apparatus and method for melting granular batch material into a molten state in the form of glass which may be heated in any desired atmosphere and at any desired pressure. With the particular arrangement shown, the combustion gases which are involved when using gas fired heaters are prevented from contacting the batch and the molten glass during the melting thereof. Furthermore, the melting chamber is formed of a temperature resisting metal such as platinum or platinum alloy, which metal chamber will not contaminate the glass as is the normal case when melting glass within a refractory lined chamber. Of particular utility is that the device may be easily cleaned so as to be capable of receiving different melts without requiring replacement of the liner material. This is particularly important from the standpoint of economically producing frits of differing content to produce frits of different colors.

As described in U.S. 2,923,636 issue Apr. 6, 1959, specific frit compositions may differ only in the chromium-oxide content, with the amount of chromium which remains in the frit being determinative to a great extent as to the color of the base glass to which it will be added. In other words, in many instances it is very important that the metal oxide content of the batch and of the frit be controlled within specific limits so as to be assured that the specific color frit will be produced. In those situations where glass which was to be used as frit were melted in refractory lined melters, it was necessary to rebuild the lining so as to eliminate contamination of the frit glass by absorbed oxides brought about by prior melting of oxide containing glasses in the furnace.

By the use of the present invention and where no absorption can be experienced by the highly temperature resistant metal, the necessity of tearing down the equipment when the composition is to be changed to make either another color or a different composition is not required.

I claim:

1. Apparatus for melting colorant glass batch comprising, an inverted heat-resisting metal cone, a refractory lined combustion chamber surrounding said cone in spaced relationship, means dividing said combustion chamber into plural, vertically separated zones, separate heating means connected to said chamber at each of said zones, a delivery tube connected to the apex of said cone and separate heating means surrounding said delivery tube for maintaining the glass molten as it flows through said delivery tube.

2. The apparatus of claim 1, wherein said heating means comprises gas fired burners and further including, a combustion product exit port opening into said chamber.

3. The apparatus of claim 1, further including, a second inverted heat-resistant metal cone mounted within said first cone and forming therewith an annular converging melting chamber.

4. The apparatus of claim 3, wherein said second metal cone is formed with a conical metal cover.

5. The apparatus of claim 4, further including, means for feeding batch ingredients onto the apex of said conical cover.

6. The apparatus of claim 4, further including, means connected to the interior of said second metal cone for applying heat to the interior thereof.

References Cited

UNITED STATES PATENTS

| | | | |
|---|---|---|---|
| 2,155,131 | 4/1939 | Hänlein | 65—157 |
| 2,781,411 | 2/1957 | Geffcken et al. | 65—347 XR |
| 3,186,823 | 1/1965 | Novack | 65—347 XR |
| 3,244,495 | 4/1966 | Apple et al. | 65—347 XR |
| 3,257,181 | 6/1966 | Stalego | 65—32 XR |

S. LEON BASHORE, Primary Examiner

S. R. FRIEDMAN, Assistant Examiner

U.S. Cl. X. R.

65—347, 356, 327, 162, 157; 263—11